United States Patent [19]

Garwood et al.

[11] 4,304,951

[45] Dec. 8, 1981

[54] HYDROTREATING OF BOTTOMS FRACTIONS RESULTING FROM CONVERSION OF METHANOL TO GASOLINE IN ORDER TO DECREASE DURENE AND PRODUCE DISTILLATE

[75] Inventors: William E. Garwood, Haddonfield; Wooyoung Lee, Cherry Hill; Hans J. Schoennagel, Lawrenceville, all of N.J.

[73] Assignee: Mobil Oil Corporation, New York, N.Y.

[21] Appl. No.: 225,061

[22] Filed: Jan. 14, 1981

[51] Int. Cl.³ .............................................. C07C 1/20
[52] U.S. Cl. .................................. 585/469; 585/639; 585/733
[58] Field of Search ....................... 585/469, 639, 733

[56] References Cited

U.S. PATENT DOCUMENTS 3,917,737 11/1975 Yoo ...................................... 585/277
4,238,631 12/1980 Daviduk ............................. 585/469

OTHER PUBLICATIONS

Smith et al., Chemical Abstracts 63 (1965) col. 13002a.

Primary Examiner—Arthur P. Demers
Attorney, Agent, or Firm—Charles A. Huggett; Michael G. Gilman; Charles J. Speciale

[57] ABSTRACT

A durene-containing gasoline obtained from the catalytic conversion of methanol after removal of at least the light olefinic fraction is subjected to hydrotreating by contact with hydrogen over a hydrogenation metal on an acidic or non-acidic support.

15 Claims, 5 Drawing Figures

Effect of Temperature on Aromatics by C no.

BOILING POINT CURVES

MTG Bottoms Charge Stock and
Isomerized Product, Catalyst ICR 106

400 psig, 500°F, 0.5 LHSV, 5000 SCF $H_2$/bbl

MTG 350°F+ BOTTOMS OVER CATALYST D

HYDROTREATING OF BOTTOMS FRACTIONS RESULTING FROM CONVERSION OF METHANOL TO GASOLINE IN ORDER TO DECREASE DURENE AND PRODUCE DISTILLATE

BACKGROUND OF THE INVENTION

This invention relates generally to the conversion of methanol so as to produce gasoline and, more particularly, to the treatment of a bottoms obtained from said conversion process in order to decrease durene and to produce distillate.

The conversion of methanol to gasoline is an important area of technology which has the potential of becoming even more important as the supply of crude oil is diminished and/or increased in price. Particularly advantageous catalysts which are utilized in the conversion of methanol to gasoline are a special class of crystalline aluminosilicate zeolite catalysts of which H-ZSM-5 is the most preferred member. There are many patents and publications which describe the conversion of methanol to gasoline over said special zeolites, including U.S. Pat. Nos. 3,931,349; 3,969,426; 3,899,544; 3,894,104; 3,904,916; 3,894,102; the disclosures of which are incorporated by reference.

One particular problem residing in the conversion of methanol to gasoline over ZSM-5 type zeolites is that durene is produced in amounts higher than that expected from $C_{10}$ aromatic equilibrium distributions. Once an aromatic ring is formed in the presence of unreacted methanol, alkylation to tetramethylbenzenes occurs rapidly, but the smaller higher melting durene molecule (1,2,4,5-tetramethylbenzene, melting point 175° F.) diffuses out of the ZSM-5 pore much more rapidly than isodurene (1,2,3,5-tetramethylbenzene) or prehnitene (1,2,3,4-tetramethylbenzene). There have been various proposals advanced in order to control or minimize the amount of durene which is produced in the catalytic conversion of methanol to gasoline. One unpublished proposal heretofore suggested by coworkers of the instant inventors includes isomerization of the bottoms fraction of a methanol to gasoline process in order to decrease the durene content.

The instant invention is directed towards an improvement over the aforementioned isomerization process in that it is directed towards hydrotreating of a bottoms fraction with hydrogenation metals on both acidic and non-acidic supports in order to enhance the conversion of durene and to produce petroleum distillates.

In one specific embodiment, the novel process of this invention is directed towards processing over an acidic oxide supported metal catalyst in an $H_2$ atmosphere, as opposed to an isomerizaton process and distinct advantages are obtained, not only with respect to catalyst life, but also with respect to product distribution and the efficiency of converting durene.

DESCRIPTION OF THE PREFERRED EMBODIMENTS

A durene-containing bottoms fraction from a methanol to gasoline process, obtained from the total gasoline fraction by topping off at least the light olefinic fraction, is hydrotreated over supported metal catalysts under conditions to reduce durene by either conversion of the durene to other compounds with preservation of the aromatic ring or hydrogenation. In general, conversion with preservation of the aromatic ring is favored by use of acidic supports and low pressure, whereas hydrogenation to make a naphthenic distillate is favored by use of strong hydrogenation metal, high pressure, and a low acidity support.

As can be seen, the first step in the novel process of this invention resides in subjecting the total gasoline derived from the conversion of methanol to a distillation process or fractionation process in order to remove at least the light olefinic fractions. It is not advantageous to treat the total gasoline fraction since the light olefins contained therein would hydrogenate to less valuable paraffins in the various hydrotreating steps. The exact point at which the total gasoline is cut is not narrowly critical and a dividing point can be at a temperature ranging from about 200° to about 400° F. A more preferred cut point range is from 300° to 400° F., and more particularly preferred being at about 350° F. This invention will be described in detail with respect to making an initial separation at 350° F., although it is to be understood that higher or lower temperatures can be used as above set forth. The 350° F.+ bottoms obtained from a conventional methanol to gasoline operation obtained by fractionating the hydrocarbon product from said process is then hydrotreated over a supported metal catalyst under conditions to reduce durene at temperatures ranging from about 450°-800° F. at hydrogen pressures of from 50-3000 psig. When operating under the aromatic ring preservation mode of this invention, the 350°+ bottoms fraction is preferably contacted with hydrogen at a pressure ranging from about 200 to 400 psig, a temperature of about 500°-700° F., utilizing as a conversion catalyst, a hydrogenation metal, or a compound thereof supported on an acidic support. Acidic supports are well known in the art and include such materials as silica-alumina, silica-magnesia, silica-titania, as well as crystalline aluminosilicate zeolites which have been base exchanged so as to replace at least part of the alkali metal cations originally associated therewith with cations having an acidic function, e.g. hydrogen, ammonium, rare earth, etc. Specific examples of operable hydrogenation components, include metals, oxides and sulfides of metals of the Periodic Table which fall into Group VIB, including chromium, molybdenum and the like; Group IIB including zinc, cadmium and Group VIII, including cobalt, nickel, platinum, palladium, rhenium, rhodium and the like and combinations of metal sulfides and oxides of metals of Group VIB, such as nickel-tungsten sulfide, cobalt oxide, molybdenum oxide and the like. If the acidic support is a crystalline aluminosilicate zeolite such as faujasite, either natural or synthetic, i.e. zeolite X or Y, then the hydrogenation component can be associated with the zeolite by techniques well known in the art, including base exchange, impregnation, electrodeposition, etc.

When operating under the hydrogenation mode, in accordance with the novel process of this invention, it is preferred that the hydrogenation be carried out in the presence of a strong hydrogenation component, i.e. platinum, palladium, etc. on a support which has little or no acidity. Such supports are well known in the art, the most common example being alumina. A preferred catalyst for operation in the hydrogenation mode of the novel process of this invention would be platinum on aluminum. It is to be noted, however, that any non-acidic support can be utilized such as silica, charcoal, as well as crystalline aluminosilicate zeolites which have had their acidity reduced or eliminated by steaming, base exchange with alkali metal cations or being synthesized so as to contain substantially no alumina in the framework lattice.

Typical operating conditions for the hydrogenation mode include temperatures of 450° to 900° F., and more preferably, from 500° to 800° F. and pressures ranging from 500 to 3000 psig and more preferably from 1000 to 2000 psig.

From a practical point of view, operations within this temperature and pressure range require the use of a rather strong hydrogenation function which can be obtained either by using strong hydrogenation components, such as platinum, in moderate amounts, or larger amounts of less strong hydrogenation components, such as cobalt molybdenum. It is to be noted, however, that certain commercial cobalt molybdenum catalysts, such as one supplied by American Cyanamid and identified as HDS-20A does not have sufficient hydrogenation activity to be operable within the conditions set forth. This catalyst would, indeed, reduce durene if operated under more severe conditions of temperature and pressure but, quite obviously, such is not economically attractive.

Figure 1:
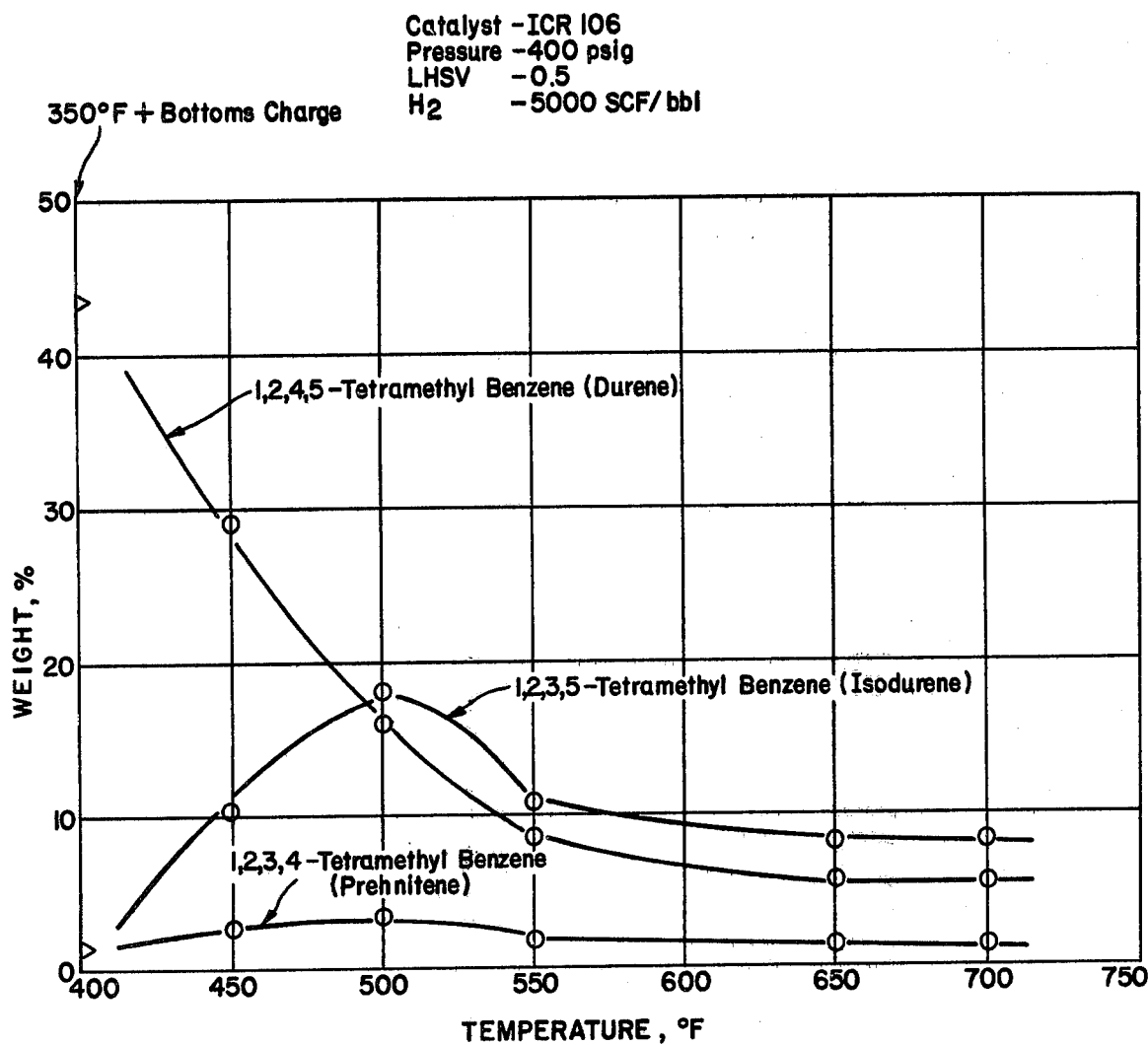
FIG. 1 is a plot of tetramethylbenzene isomer distribution versus temperature.

The following examples will illustrate the novel process of this invention.

EXAMPLE 1

Charge Stock

The charge stock used in all of the examples which follow was obtained by distilling the liquid hydrocarbon product obtained by converting methanol to gasoline over a fixed bed of H-ZSM-5 at an inlet temperature of 680° F., outlet temperature of 770° F., a pressure of 300 psig and an WHSV of 1.6. The distillation was carried out to a cut point of 350° F. in order to obtain two fractions. The tetramethylbenzenes were distributed as follows:

|  | Total | IBP-350° F. | 350° F.+ Bottoms |
|---|---|---|---|
| Wt. % of cut | 100 | 89 | 11 |
| Tetramethylbenzene Contents, Wt. % | | | |
| 1,2,4,5 (Durene) | 6.8 | 2.6 | 43.8 |
| 1,2,3,5 (Isodurene) | 0.2 | 0.1 | 1.6 |
| 1,2,3,4 (Prehnitene) | 0.1 | <0.1 | 1.1 |
| Octane No., R+O | 94.1 | 91.9 | Solid* |

*Calculated by difference, 111

The 350° F.+ bottoms were solid at room temperature. The detailed composition is shown in Table 4.

EXAMPLE 2

Catalysts

Four different catalysts were used in carrying out experimental studies which are identified as follows:

(A) Pt/Al

This platinum on alumina catalyst was prepared by impregnating gamma alumina with chloroplatinic acid to 0.6 weight percent platinum. The chlorine content of the dried catalyst was 0.7 weight percent. The catalyst was reduced in situ with hydrogen at 900° F. prior to use.

(B) Co/Mo/Al

This is a cobalt-molybdenum on alumina catalyst sold by the American Cyanamid Company under their designation HDS-20A which was precoked and presulfided.

Ni/W/Ti/Si/Al

This is nickel-tungsten-titanium deposited on silica-alumina and is a commercially available hydrocracking catalyst supplied by the Chevron Chemical Company under their designation ICR-106. It contained 19.7 weight percent tungsten, 6.5 weight percent nickel, 4.5 weight percent titanium, 0.04 weight percent cobalt oxide, and 0.03 weight percent molybdenum oxide. Prior to use, this catalyst was sulfided by treatment with 2% $H_2S$ in $H_2S$ at 750° F.

(D) Ni/W/Si/Al/REHX

This is a nickel-tungsten deposited on a 50/50 parts by weight composite of a rare earth ammonium ion exchanged zeolite X in a silica-alumina matrix. It contained 10.1 wt. % tungsten and 3.8 wt. % nickel. The catalyst was sulfided prior to use by treatment with 2% $H_2S$ at 750° F.

EXAMPLE 3

A series of runs were made with the Ni/W/Ti/Si/Al catalyst at various temperatures and pressures. All runs were made with 10 cc of catalyst in a microunit equipped with heated charge and product lines. Overnight material balances were made. Light and heavy gas (from weathering of dry ice trap) compositions were determined by mass spec, and liquid product compositions by gas chromatography. Hydrogen consumptions were calculated from the hydrogen content of charge and products. Octane numbers (R+O) were obtained on both total liquid product (where liquid at room temperature) and 330° F.− distillation overheads. Pour point, aniline no., and H/C ratio determinations were made on the 350° F.+ distillation bottoms. Hydrogen circulation and LHSV were kept constant at 5000 SCF/bbl and 0.5, respectively.

The actual runs and the results are shown in Table I.

TABLE 1

RUN DATA
Catalyst - ICR 106, Ni/W/Ti/Si/Al

Charge-350° F.+
MTG Bottoms                         Conditions-0.5 LHSV, 5000 SCF $H_2$/bbl

| | CHARGE | 200 | ← | ← | 400 | → | → | 700 | 875[1] | ← | 1500 | → |
|---|---|---|---|---|---|---|---|---|---|---|---|---|
| Pressure, psig | | | | | | | | | | | | |
| Temp. °F. Average | | 550 | 450 | 501 | 552 | 650 | 699 | 650 | 650 | 550 | 600 | 651 |
| Max. | | 554 | 452 | 505 | 556 | 653 | 703 | 653 | 652 | 553 | 601 | 652 |

TABLE 1-continued

RUN DATA
Catalyst - ICR 106, Ni/W/Ti/Si/Al

Charge-350° F.+ MTG Bottoms

Conditions-0.5 LHSV, 5000 SCF $H_2$/bbl

| | | | | | | | | | | | |
|---|---|---|---|---|---|---|---|---|---|---|---|
| Mat. Bal. Time. Hrs. | | 19 | 18½ | 23 | 23 | 19 | 22½ | 22 | 19 | 22½ | 23 | 23 |
| Accumulative Time, Days | | 5.0 | 4.2 | 3.4 | 2.4 | 6.2 | 7.1 | 4.6 | 5.4 | 1.8 | 2.8 | 3.7 |
| Liquid Product Gravity, °API | 29.5 | 31.5 | 29.9 | 31.3 | 35.4 | 38.7 | 40.0 | 44.4 | 41.3 | 36.9 | 42.5 | 49.8 |
| Pour Point, °F. | +85 | −5 | +70 | −15 | −60 | <−70 | −70 | <−70 | <−70 | +5 | <−70 | <−70 |
| O. N., R + O | — | 100.0 | 101.4 | 99.9 | 95.7 | 95.3 | 97.2 | 87.4 | 88.6 | 88.3 | 80.5 | 80.2 |
| Tetramethyl Benzenes, wt % | | | | | | | | | | | | |
| 1,2,4,5-TetraMe (Durene) | 43.8 | 12.9 | 29.0 | 15.8 | 8.7 | 6.3 | 6.3 | 3.7 | 5.6 | 12.5 | 4.9 | 1.1 |
| 1,2,3,5-TetraMe (Durene) | 1.6 | 15.7 | 10.3 | 18.0 | 10.9 | 8.2 | 8.3 | 4.0 | 7.2 | 10.3 | 5.0 | 0.9 |
| 1,2,3,4-TetraMe (Durene) | 1.1 | 2.8 | 2.7 | 3.2 | 1.9 | 1.6 | 1.8 | 0.9 | 1.5 | 2.5 | 1.2 | 0.3 |
| Mat. Bal, Wt % | 1 | 98.0 | 96.6 | 97.7 | 96.2 | 96.9 | 97.4 | 95.1 | 98.8 | 96.1 | 95.1 | 94.5 |
| Yields, Wt % (NLB) | | | | | | | | | | | | |
| $C_1 + C_2$ | | <0.1 | <0.1 | <0.1 | <0.1 | 0.3 | 0.8 | 0.3 | 1.7 | <0.1 | <0.1 | 0.1 |
| $C_3$ | | 0.5 | 0.1 | 0.3 | 1.0 | 2.1 | 2.6 | 1.6 | 2.4 | 0.2 | 0.7 | 1.4 |
| $C_4$ | | 0.8 | 0.1 | 0.4 | 1.7 | 5.1 | 6.2 | 5.9 | 6.4 | 0.9 | 2.4 | 5.6 |
| $C_5$-330° F. | | 12.0 | } 100.2 | 7.4 | 25.0 | 39.4 | 39.7 | 54.1 | 41.2 | 22.6 | 38.8 | 64.3 |
| 330° F.+ | | 87.2 | | 92.5 | 73.9 | 54.7 | 52.1 | 41.4 | 51.2 | 78.0 | 61.6 | 32.6 |
| | | 100.5 | 100.4 | 100.6 | 101.6 | 101.6 | 101.4 | 103.3 | 102.9 | 101.7 | 103.1 | 104.0 |
| $H_2$ Consumption, SCF/bbl | | 315 | 215 | 360 | 900 | 980 | 840 | 1940 | 1710 | 970 | 1785 | 2375 |
| $C_5$-330° F. Gasoline | | | | | | | | | | | | |
| Gravity, °API | | 41.1 | | 39.8 | 44.5 | 47.7 | 48.1 | 51.5 | 50.3 | 44.6 | 49.0 | 52.8 |
| Specific | | 0.8198 | | 0.8261 | 0.8038 | 0.7895 | 0.7879 | 0.7731 | .7785 | 0.8035 | 0.7838 | 0.7676 |
| O.N. R + O | | — | | — | 92.0 | 89.6 | 92.7 | 81.1 | 84.2 | 82.3 | 81.2 | 77.5 |
| Boiling Range °F. (D-2887) | | | | | | | | | | | | |
| 10% | | 239 | | 270 | 232 | 135 | 97 | 157 | 139 | 196 | 194 | 164 |
| 50 | | 343 | | 350 | 339 | 282 | 279 | 279 | 279 | 294 | 294 | 288 |
| 90 | | 390 | | 392 | 386 | 336 | 336 | 333 | 334 | 341 | 336 | 332 |
| 330° F.+ Distillate | | | | | | | | | | | | |
| Gravity °API | 29.5 | 29.9 | | 29.8 | 31.8 | 31.6 | 30.2 | 35.4 | 33.5 | 34.0 | 38.2 | 42.2 |
| Specific | 0.8789 | 0.8769 | | 0.8774 | 0.8665 | 0.8677 | 0.8748 | 0.8476 | .8577 | 0.8551 | 0.8338 | 0.8145 |
| Pour Point °F. | +85 | — | | +15 | −25 | −20 | −15 | −70 | −25 | +20 | <−70 | <−70 |
| Aniline No. | — | <20 | | <20 | <20 | <20 | <20 | <20 | 40.0 | 40.0 | 83.9 | 117.1 |
| Diesel Index | — | <10 | | <10 | <10 | <10 | <10 | <10 | 13.4 | 13.6 | 32.0 | 49.4 |
| Hydrogen Wt % | 10.43 | 10.60 | | 10.72 | 11.05 | 10.88 | 10.48 | 11.40 | 11.86 | 12.06 | 12.80 | 13.14 |
| Carbon Wt % | 88.6 | 88.38 | | 88.52 | 88.10 | 86.63 | 88.10 | 87.87 | 87.64 | 86.46 | 87.05 | 84.97 |
| H/C Ratio | 1.40 | 1.43 | | 1.44 | 1.49 | 1.49 | 1.42 | 1.55 | 1.61 | 1.66 | 1.75 | 1.84 |
| Boiling Range °F. (D-2887) | | | | | | | | | | | | |
| 10% | 322 | 365 | | 365 | 363 | 317 | 317 | 314 | 314 | 313 | 307 | 309 |
| 50 | 395 | 425 | | 433 | 411 | 359 | 356 | 359 | 355 | 371 | 352 | 342 |
| 90 | 537 | 496 | | 497 | 492 | 424 | 422 | 426 | 423 | 441 | 429 | 420 |
| 95 | 737 | 504 | | 508 | 500 | 445 | 444 | 446 | 440 | 460 | 449 | 438 |
| 98 | 861 | 517 | | 526 | 512 | 460 | 450 | 462 | 457 | 491 | 476 | 459 |

(1) 80% $H_2$, 20% CO

EXAMPLE 4

The procedure of Example 3 was repeated using the Co/MO/Al catalyst. The operating conditions are shown in Table 2.

TABLE 2

RUN DATA
Catalyst HDS-20A, Co/Mo/Al

Charge - 350° F.+ MTG Bottoms     Conditions 0.5 LHSV, 5000 SCF $H_2$/bbl

| | | | | | |
|---|---|---|---|---|---|
| Pressure, psig | CHARGE | ← 400 → | | ← 2000 → | |
| Temp., °F., Average | | 600 | 651 | 650 | 751 |
| Max. | | 603 | 655 | 653 | 754 |
| Mat. Bal. Time, Hrs. | | 18½ | 23½ | 16½ | .22 |
| Accumulative Time, Days | | 0.8 | 1.8 | 2.4 | 3.3 |
| Liquid Product Gravity, °API | 29.5 | 30.5 | 29.8 | 31.3 | 34.7 |
| Pour Point, °F. | +85 | +85 | +85 | +85 | +65 |
| O.N., R + O | — | — | — | — | 91.4 |

TABLE 2-continued

RUN DATA
Catalyst HDS-20A, Co/Mo/Al

Charge - 350° F.+ MTG Bottoms     Conditions 0.5 LHSV, 5000 SCF $H_2$/bbl

| | | |
|---|---|---|
| Tetramethyl Benzenes wt. % | | |
| 1,2,4,5-TetraMe (Durene) | 43.8 | 28.1 |
| 1,2,3,5-TetraMe | 1.6 | 2.0 |
| 1,2,3,4-TetraMe | 1.1 | 0.7 |
| Mat. Bal. Wt. % | | 102.2 |
| Yields, NLB | | |
| $C_1 + C_2$ | | <0.1 |
| $C_3$ | | 0.1 |
| $C_4$ | | 0.1 |
| $C_5$ −330° F. | | } 100.8 |
| 350° F.+ | | |
| $H_2$ Consumption, | | |

TABLE 2-continued
RUN DATA
Catalyst HDS-20A, Co/Mo/Al

| Charge - 350° F.+ MTG Bottoms | Conditions 0.5 LHSV, 5000 SCF H₂/bbl |
|---|---|
| SCF/bbl | 580 |

EXAMPLE 5

The procedure of Example 3 was repeated using the Pt/Al catalyst. The operating conditions are shown in Table 3.

TABLE 3
RUN DATA
CATALYST - R F - 1009, 0.6% Pt on Alumina

Charge - 350° F.+ MTG Bottoms    Conditions- 0.5 LHSV, 5000 SCF H₂bbl.

| | CHARGE | | | | |
|---|---|---|---|---|---|
| Pressure, psig | | 400 | ← 700 → | | 1500 |
| Temp., °F. Average | | 656 | 650 | 700 | 752 |
| Max. | | 656 | 657 | 704 | 758 |
| Mat, Bal. Time Hours | | 22½ | 6 | 16½ | 18 |
| Accumulative Time, Days | | 0.9 | 1.2 | 1.8 | 2.5 |
| Liquid Product Gravity, API | 29.5 | 32.2 | — | 34.7 | 44.2 |
| Pour Point, °F. | ±85 | +80 | +80 | +75 | <−70 |
| O.N., R + O | — | — | — | — | 77.2 |
| Tetramethyl Benzenes, wt. % | | | | | |
| 1,2,4,5-TetraMe (Durene) | 43.8 | | | | 5.0 |
| 1,2,3,5-TetraMe | 1.6 | | | | 1.2 |
| 1,2,3,4-TetraMe | 1.1 | | | | 0.2 |
| Mat. Bal. Wt % | | | | 100.2 | 96.4 |
| Yields, Wt % (NLB) | | | | | |
| C₁ + C₂ | | | | <0.1 | <0.1 |
| C₃ | | | | 0.2 | 0.1 |
| C₄ | | | | 0.2 | 0.3 |
| C₅-330° F. | | | | } 101.9 | 55.3 |
| 330° F.+ | | | | | 48.8 |
| | | | | 102.3 | 104.4 |
| H₂ Consumption, SCF/bbl. | | | | 1340 | 2560 |
| C₅330° F. Gasoline | | | | | |
| Gravity, °API | | | | | 48.2 |
| Specific | | | | | 0.7876 |
| O.N., R + O | | | | | 76.0 |
| Boiling Range, °F. (D-2887) | | | | | |
| 10% | | | | | 277 |
| 50 | | | | | 314 |
| 90 | | | | | 341 |
| 330° F.+ Distillate | | | | | |
| Gravity, °API | 29.5 | | | | 39.4 |
| Specific | 0.8789 | | | | 0.8280 |
| Pour Point, °F. | +85 | | | | <−70 |
| Aniline No. | — | | | | 118.2 |
| Diesel Index | — | | | | 46.6 |
| Hydrogen, Wt % | 10.43 | | | | 13.60 |
| Carbon, Wt % | 88.6 | | | | 86.41 |
| H/C Ratio | 1.40 | | | | 1.87 |
| Boiling Range, °F. (D-2887) | | | | | |
| 10% | 322 | | | | 315 |
| 50 | 395 | | | | 373 |
| 90 | 537 | | | | 455 |
| 95 | 737 | | | | 506 |
| 98 | 861 | | | | 628 |

Complete product compositions were determined for some of the runs from Examples 3-5 and said compositions are set forth in Table 4.

TABLE 4
PRODUCT COMPOSITIONS

| CATALYST | | ← ← Ni/W/Ti/Si/Al, ICR-106 → → | | | | | | | | | | | Co/Mo/Al HDS-20A | Pt/Al RF-1009 |
|---|---|---|---|---|---|---|---|---|---|---|---|---|---|---|
| Pressure, psig | CHARGE | 200 | ← | ← | 400 | → | 700 | 875⁽¹⁾ | ← | 1500 | → | 2000 | | 1500 |
| Temp., °F. Average | | 550 | 450 | 501 | 552 | 650 | 699 | 650 | 550 | 600 | 651 | 751 | 752 | |
| Liquid Product | 29.5 | 31.9 | 29.9 | 31.3 | 35.4 | 38.7 | 40.0 | 44.4 | 41.3 | 36.9 | 42.5 | 49.8 | 34.7 | 44.2 |
| GRAVITY, °API | | | | | | | | | | | | | | |
| Four Point, °F. | +85 | −5 | +70 | −15 | −60 | — | −70 | — | — | +5 | <−70 | <−70 | +65 | <−70 |
| O. N., R + O | | 100.0 | | 99.9 | 95.7 | 95.3 | 97.2 | 87.4 | 88.6 | 88.3 | 80.5 | 80.2 | 94.1 | 77.2 |
| Product Composition, Wt % | | | | | | | | | | | | | | |
| C₁ | — | — | — | — | 0.1 | 0.3 | 0.1 | 1.1 | — | — | 0.1 | | — | — |
| C₂ | — | — | — | — | 0.2 | 0.5 | 0.2 | 0.6 | | — | — | | — | — |
| C₃ | | 0.3 | 0.1 | 0.3 | 1.0 | 2.1 | 2.6 | 1.6 | 2.4 | 0.2 | 0.7 | 1.4 | 0.1 | 0.1 |
| C₄ | | 0.8 | 0.1 | 0.4 | 1.7 | 5.1 | 6.2 | 5.9 | 6.4 | 0.9 | 2.4 | 5.6 | 0.1 | 0.3 |
| C₅ | | 0.5 | 0.1 | 0.3 | 0.9 | 2.6 | 3.3 | 2.7 | 2.6 | 0.2 | 0.7 | 2.2 | — | 0.3 |
| C₆ Total | | 0.5 | — | 0.2 | 1.3 | 3.4 | 3.9 | 5.9 | 4.0 | 0.8 | 2.3 | 5.6 | 0.2 | 0.6 |

TABLE 4-continued

PRODUCT COMPOSITIONS

| CATALYST | ← ← Ni/W/Ti/Si/Al, ICR-106 → → | | | | | | | | | | | Co/Mo/Al HDS-20A | Pt/Al RF-1009 |
|---|---|---|---|---|---|---|---|---|---|---|---|---|---|
| P | 0.3 | — | 0.1 | 0.6 | 1.4 | 1.7 | 2.0 | 1.5 | 0.2 | 0.6 | 1.7 | 0.1 | 0.3 |
| O | — | — | — | — | — | — | — | — | — | — | — | — | — |
| N | 0.2 | — | 0.1 | 0.7 | 1.9 | 2.1 | 3.9 | 2.5 | 0.6 | 1.7 | 3.9 | 0.1 | 0.3 |
| A | — | — | — | — | 0.1 | 0.1 | — | — | — | — | — | — | — |
| $C_7$ Total | 0.9 | 0.1 | 0.7 | 2.1 | 4.1 | 4.4 | 5.1 | 4.4 | 0.8 | 1.7 | 3.6 | 0.5 | 0.4 |
| P | 0.1 | — | 0.1 | 0.2 | 0.6 | 0.4 | 0.6 | 0.7 | 0.1 | 0.2 | 0.5 | 0.1 | 0.1 |
| O | — | — | — | — | — | 0.1 | 0.1 | 0.1 | — | — | 0.2 | — | — |
| N | 0.3 | — | 0.2 | 1.1 | 2.3 | 2.1 | 3.6 2.8 | 0.5 | 1.3 | 2.8 | 0.3 | 0.3 | — |
| A | 0.5 | 0.1 | 0.4 | 0.8 | 1.2 | 1.8 | 0.8 | 0.8 | 0.2 | 0.2 | 0.1 | 0.1 | — |
| $C_8$ Total | 2.3 | 3.2 | 2.6 | 3.6 | 6.7 | 8.8 | 10.8 | 5.6 | 6.1 | 2.1 | 2.9 | 1.4 | 2.2 | 0.9 |
| P | — | 0.1 | — | 0.1 | 0.2 | 0.3 | 0.3 | 0.6 | 0.4 | 0.1 | 0.2 | 0.6 | 0.1 | 0.2 |
| O | — | — | — | — | — | 0.1 | — | 0.1 | — | 0.1 | 1.4 | — | — | 0.1 |
| A | 2.3 | 3.1 | 2.6 | 3.5 | 6.5 | 8.5 | 10.5 | 4.9 | 5.7 | 1.9 | 1.3 | 0.8 | 2.1 | 0.6 |
| $C_9$ Total | 23.4 | 33.3 | 27.4 | 27.5 | 34.7 | 35.1 | 37.1 | 26.4 | 30.5 | 21.1 | 17.4 | 17.3 | 21.5 | 23.8 |
| P | 0.2 | 0.5 | 0.6 | 0.5 | 1.6 | 2.3 | 1.4 | 6.1 | 3.7 | 3.4 | 6.0 | 9.4 | 1.6 | 9.1 |
| O | — | 0.1 | 0.1 | — | 0.4 | 0.9 | 1.8 | 2.0 | 2.7 | 0.8 | 1.8 | 4.8 | 0.5 | 10.0 |
| A | 23.2 | 32.7 | 26.7 | 27.0 | 32.7 | 31.9 | 33.9 | 18.3 | 24.1 | 16.9 | 9.6 | 3.1 | 19.4 | 4.7 |
| $C_{10}$ Total | 59.8 | 43.4 | 52.6 | 48.4 | 29.5 | 20.8 | 20.5 | 14.2 | 18.4 | 35.8 | 17.8 | 43 | 36.2 | 10.9 |
| P | — | — | 0.1 | — | 0.2 | 0.1 | 0.1 | 0.3 | 0.2 | 0.2 | 1.5 | 0.6 | 0.2 | 1.7 |
| O | — | — | — | — | — | — | — | — | — | — | — | — | — | — |
| A | 59.8 | 43.4 | 52.5 | 48.4 | 29.3 | 20.7 | 20.4 | 13.9 | 18.2 | 35.6 | 16.3 | 3.7 | 36.0 | 9.2 |
| $C_{11}$ Aromatics | 10.7 | 10.1 | 12.9 | 11.3 | 8.4 | 5.0 | 4.4 | 4.2 | 4.7 | 9.4 | 5.9 | 0.9 | 13.2 | 3.2 |
| Unknown ($C_{10}+$) | 3.8 | 7.3 | 4.5 | 7.9 | 15.3 | 14.3 | 7.4 | 31.4 | 21.7 | 30.6 | 51.2 | 61.6 | 27.0 | 63.9 |
|  | 100.0 | 100.5 | 100.4 | 100.6 | 101.6 | 101.6 | 101.4 | 103.3 | 102.9 | 101.9 | 103.0 | 104.0 | 100.8 | 104.4 |
| Total Aromatics, Wt % | 96.0 | 89.7 | 94.8 | 90.6 | 77.7 | 67.4 | 71.1 | 42.1 | 53.5 | 64.0 | 33.5 | 7.8 | 70.8 | 18.0 |
| Durene, Wt % of Total Product | 44 | 13 | 29 | 16 | 9 | 6 | 6 | 4 | 5 | 13 | 5 | 1 | 28 | 5 |
| Durene, Wt % of Total Aromatics | 46 | 14 | 31 | 17 | 11 | 9 | 8 | 9 | 10 | 20 | 15 | 13 | 40 | 28 |
| Durene, Wt % of $C_{10}$ Aromatics | 73 | 30 | 55 | 33 | 30 | 29 | 29 | 29 | 27 | 36 | 31 | 27 | 78 | 54 |

EXAMPLE 6

A series of runs were made with the Ni/W/Si/Al/-REHX catalyst at various temperatures while maintaining a constant pressure of 400 psig. The runs were made as described in Example 3. Hydrogen circulation and LHSV were varied and in some runs no hydrogen was employed but nitrogen was substituted in its place.

The actual runs and the results are shown in Table 5:

TABLE 5

Run Data

| | Charge | $H_2$ | | | | | | | $N_2$ | $H_2$ | | $N_2$ | |
|---|---|---|---|---|---|---|---|---|---|---|---|---|---|
| Atmosphere | | | | | | | | | | | | | |
| LHSV | | 0.5 | 0.5 | | | | | | 1 | | | | |
| $H_2$ or $N_2$, SCF/bbl | | 5000 | 5000 | | | | | | 2500 | | | | |
| Temp., °F. | | 499 | 500 | 500 | 525 | 549 | 550 | 550 | 550 | 550 | 699 | 800 | 901 |
| Mat. Bal. Time, Hrs. | | 22 | 23 | 23 | 23 | 23 | 23 | 23 | 20 | 17 | 20 | 20 | 23 |
| TOS, Days | | 0.9 | 1.9 | 3.8 | 4.7 | 5.7 | 6.7 | 7.6 | 8.4 | 9.1 | 9.9 | 10.7 | 11.7 |
| Liq. Prod. Gravity, °API | 30.0 | 33.0 | 32.6 | 32.4 | 30.8 | 31.1 | 32.5 | 32.1 | 31.6 | 29.4 | 29.3 | 29.1 | 29.3 | 29.0 |
| Pour Point, °F. | | −10 | −10 | +10 | +5 | −5 | 0 | +5 | >75 | +50 | >75 | 75 | >75 |
| O.N., R + O | | 102.9 | 103.1 | 102.0 | 102.7 | 103.0 | 102.1 | 102.2 | — | 103.2 | — | — | — |
| Tetra Me Benzenes, Wt. % | | | | | | | | | | | | | |
| Durene | 51.9 | 11.3 | 11.8 | 15.0 | 14.5 | 12.6 | 13.2 | 13.7 | 47.3 | 23.9 | 52.2 | 52.7 | 52.9 |
| Isodurene | 3.0 | 13.5 | 14.0 | 17.2 | 17.2 | 15.7 | 16.4 | 17.1 | 8.1 | 21.6 | 4.9 | 4.9 | 4.0 |
| Prehnitine | 0.7 | 2.3 | 2.4 | 3.0 | 3.1 | 2.8 | 3.0 | 3.1 | 3.7 | 3.0 | 1.6 | 1.6 | 1.4 |
| Total | 55.6 | 28.1 | 28.2 | 35.2 | 34.8 | 31.1 | 32.6 | 33.9 | 59.5 | 48.5 | 58.7 | 59.2 | 58.3 |
| Mat. Bal, Wt. % | | 95.3 | 99.7 | 102.0 | 100.4 | 100.8 | 100.5 | 99.9 | 99.7 | 100.2 | 98.4 | 98.9 | 98.7 |
| Yields, Wt % | | | | | | | | | | | | | |
| $C_1 + C_2$ | — | 0.1 | <0.1 | <0.1 | <0.1 | 0.3 | 0.3 | 0.2 | <0.1 | <0.1 | <0.1 | <0.1 | <0.1 |
| $C_3$ | — | 1.7 | 1.6 | 0.7 | 0.8 | 1.2 | 1.0 | 0.9 | <0.1 | 0.4 | <0.1 | <0.1 | <0.1 |
| $C_4$ | — | 1.4 | 1.3 | 0.7 | 0.7 | 1.7 | 1.4 | 1.2 | <0.1 | 0.4 | <0.1 | <0.1 | <0.1 |
| $C_5$ | — | 1.1 | 0.9 | 0.5 | 0.7 | 1.2 | 0.9 | 0.9 | 0.1 | 0.2 | <0.1 | <0.1 | <0.1 |
| $C_6+$ | 100 | 95.7 | 96.3 | 98.0 | 97.7 | 95.9 | 96.4 | 96.8 | 99.9 | 98.8 | 99.9 | 100.0 | 100.00 |
| $H_2$ Cons., SCF/bbl | | 150 | 80 | −90 | −50 | 210 | 30 | 0 | — | 130 | — | — | — |
| Aromatics Dist., Wt. % | | | | | | | | | | | | | |
| $C_6$ | — | <0.1 | <0.1 | <0.1 | <0.1 | <0.1 | <0.1 | <0.1 | <0.1 | <0.1 | <0.1 | <0.1 | <0.1 |
| $C_7$ | — | 0.7 | 0.6 | 0.4 | 0.4 | 0.6 | 0.8 | 0.5 | <0.1 | 0.2 | <0.1 | <0.1 | <0.1 |
| $C_8$ | 0.3 | 8.1 | 7.7 | 5.0 | 5.1 | 6.5 | 6.2 | 5.6 | 0.9 | 2.1 | 0.5 | 0.3 | 0.4 |
| $C_9$ | 18.9 | 35.9 | 35.5 | 30.4 | 29.5 | 29.8 | 29.4 | 30.9 | 20.9 | 22.0 | 19.3 | 19.2 | 19.5 |
| $C_{10}$ | 66.7 | 34.1 | 35.2 | 45.5 | 46.1 | 38.7 | 44.4 | 43.8 | 60.3 | 62.2 | 70.1 | 70.4 | 69.2 |
| $C_{11}+$ | 9.3 | 7.4 | 8.4 | 11.1 | 10.6 | 11.8 | 8.1 | 9.1 | 6.3 | 9.4 | 8.6 | 8.5 | 9.3 |
| Total | 95.2 | 86.2 | 87.4 | 92.4 | 91.7 | 87.4 | 88.9 | 89.9 | 98.4 | 95.5 | 98.5 | 98.4 | 98.4 |
| Durene Distribution | | | | | | | | | | | | | |
| Wt. % of Total Product | 52 | 11 | 12 | 15 | 15 | 13 | 13 | 14 | 48 | 24 | 52 | 53 | 53 |
| Wt. % of Tetramethylbenzene | 93 | 40 | 42 | 43 | 42 | 41 | 40 | 40 | 80 | 49 | 89 | 89 | 91 |

TABLE 5-continued

| | Run Data | | | | | | | | | | | |
|---|---|---|---|---|---|---|---|---|---|---|---|---|
| Wt. % of $C_{10}$ Aromatics | 79 | 35 | 34 | 33 | 31 | 33 | 30 | 31 | 68 | 38 | 74 | 75 | 76 |
| % Reduction in Durene | — | 78 | 77 | 71 | 72 | 76 | 75 | 74 | 9 | 54 | Nil | Nil | Nil |

Discussion of Results

A. Ni/W/Ti/Si/Al

Effect of temperature

Durene conversion becomes significant at temperatures above about 450° F. This is graphically illustrated in FIG. 1 which is a plot (based on Tables 1 and 4) of tetramethylbenzene isomer distribution versus temperature. Isodurene is the main product and is higher than durene at 500°–700° F., while prehnitene is essentially unchanged. These and other pertinent results are summarized in Table 6 below:

TABLE 6

Temperature Effect-Product Distribution of $C_{10}$ Aromatics
400 psig

| Temperature, °F. | Charge | 450 | 500 | 550 | 650 | 700 |
|---|---|---|---|---|---|---|
| Durene, wt. % | 43.8 | 29.0 | 15.8 | 8.7 | 6.3 | 6.3 |
| Isodurene | 1.6 | 10.3 | 18.0 | 10.9 | 8.2 | 8.3 |
| Prehnitene | 1.1 | 2.7 | 3.2 | 1.9 | 1.6 | 1.8 |
| Total $C_{10}$ Aromatics | 59.8 | 52.5 | 48.4 | 24.3 | 20.7 | 20.4 |
| Total Aromatics | 96.0 | 94.8 | 90.6 | 77.7 | 67.4 | 17.1 |
| Durene Dist., wt. % of | | | | | | |
| $C_{10}$ Aromatics | 73 | 55 | 33 | 30 | 30 | 30 |
| Total Aromatics | 46 | 31 | 17 | 11 | 9 | 9 |

The 30% concentration of durene in total $C_{10}$ aromatics appears to be an equilibrium value at 500° F. and higher.

Figure 2:
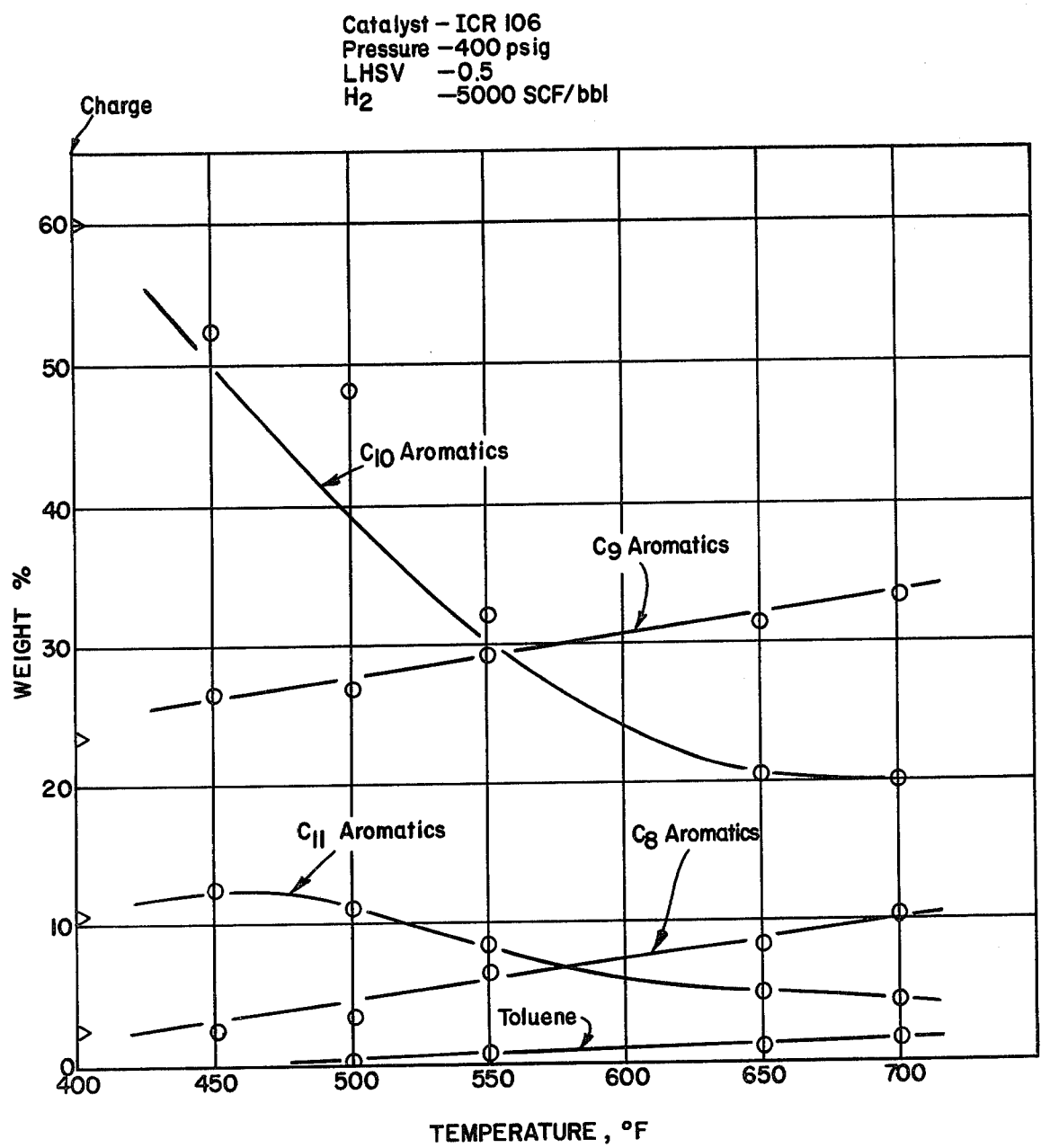
FIG. 2 is a plot which shows the effect of temperatures on aromatics by carbon number.

Both total aromatics and $C_{10}$ aromatics decrease with temperature. FIG. 2 shows the change in all the aromatics by carbon number. It can be seen that the $C_{11}$ aromatics also decrease, but not as much as the $C_{10}$. Both $C_9$ and $C_8$ aromatics increase significantly, and toluene, not present in the charge, also appears. This all indicates that, in addition to some isomerization, dealkylation is also occurring.

At the upper temperature range some lighter paraffins, mainly butanes appear. The dealkylation is thus not simple conversion to methane, but generates primarily $C_3$–$C_5$ paraffins. Some hydrogenation of aromatic rings is also occurring, as indicated by hydrogen consumption and appearance of $C_{10}+$ saturates (naphthenes). Octane No. (R+O), however, does not drop below 95 at this pressure.

TABLE 7

Temperature Effect
$C_1$-$C_5$ Yields, $C_5+$ Octane No., $H_2$ Consumption
400 psig

| Temperature, °F. | Charge | 450 | 500 | 550 | 650 | 700 |
|---|---|---|---|---|---|---|
| $C_1$, wt. % | — | — | — | — | 0.1 | 0.3 |
| $C_2$, wt. % | — | — | — | — | 0.2 | 0.5 |
| $C_3$, wt. % | — | 0.1 | 0.3 | 1.0 | 2.1 | 2.6 |
| $C_4$, wt. % | — | 0.1 | 0.4 | 1.7 | 5.1 | 6.2 |
| $C_5$, wt. % | — | 0.1 | 0.3 | 0.9 | 2.6 | 3.3 |
| $C_{10}+$ saturates | 3.8 | 4.5 | 7.9 | 15.3 | 14.3 | 7.4 |
| $H_2$ Cons., SCF/bbl | — | 215 | 360 | 900 | 980 | 840 |
| $C_5+$O.N., R + O | — | 101.4 | 99.9 | 95.7 | 95.3 | 97.2 |

Figure 3:
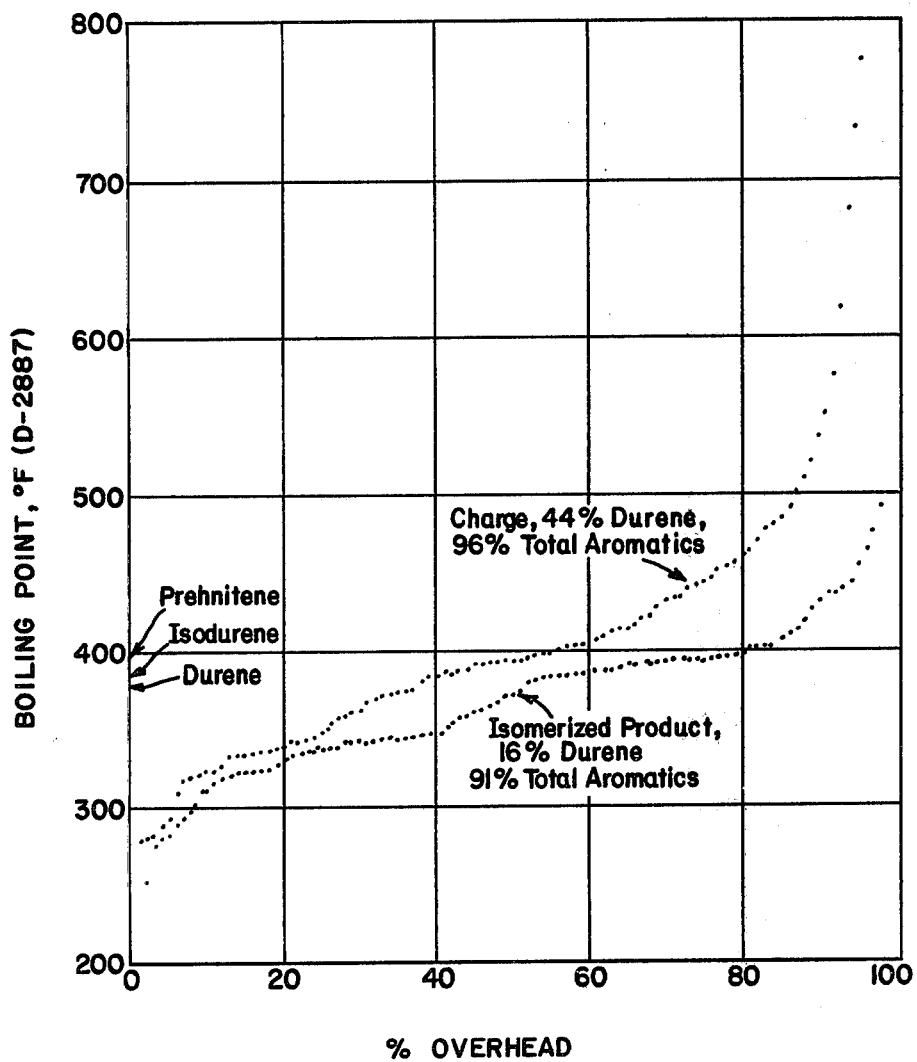
FIG. 3 is a plot of boiling point versus percent overhead.

The run at 500° F. represents the optimum for lowering durene while maintaining $C_5$ yield (99.9 weight percent) and octane (99.9 R+O). The boiling point curve of this product is compared with that of the charge in FIG. 3. It is 10°–50° F. lower boiling throughout, and shows a desirable disappearance of a very high boiling "tail" in the charge.

A run was made at 875 psig, 650° F. with a hydrogen stream containing 20% CO (Table 1) to demonstrate that the use of a purified $H_2$ stream is not necessary. Methane make was 1.7 weight percent due to some hydrogenation of CO, but durene isomerization was satisfactory.

Effect of Pressure

Figure 4:
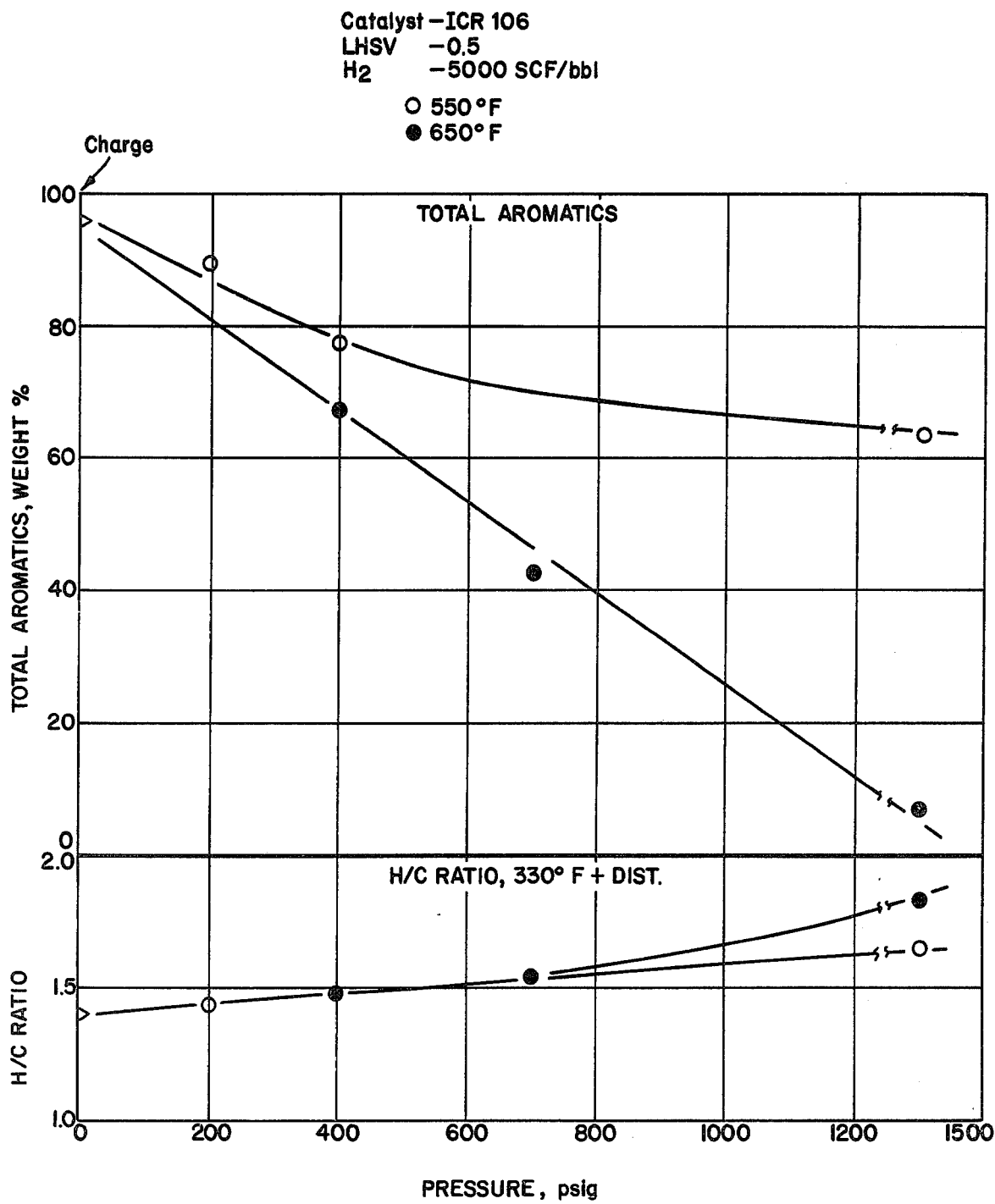
FIG. 4 is a plot of total aromatics versus pressure.

Total aromatics were reduced to 8% by increasing pressure to 1500 psig, 650° F. (FIG. 4). Hydrogenation was not as complete at 550° F. Light paraffin make was not effected by pressure, and the octane no. of the saturated product was low, as expected. Also, as expected, the equilibrium concentration of durene of about 30% in the $C_{10}$ aromatics was uneffected by pressure.

TABLE 8

| Pressure Effect | | | | | | | |
|---|---|---|---|---|---|---|---|
| | | 550° F. | | | 650° F. | | |
| Pressure, psig | Charge | 200 | 400 | 1500 | 400 | 700 | 1500 |
| $C_4-$, wt. % | — | 1.3 | 2.7 | 1.1 | 7.5 | 7.8 | 7.1 |
| Total Aromatics, Wt. % | 96.0 | 89.7 | 77.7 | 64.0 | 67.4 | 42.1 | 7.8 |
| $H_2$ Cons., SCF/bbl | — | 315 | 900 | 970 | 900 | 1940 | 2375 |
| $C_5+$ O.N., R + O | — | 100. | 95.7 | 88.3 | 95.4 | 87.4 | 80.2 |
| Durene, wt. % | 43.8 | 12.9 | 8.7 | 12.5 | 6.3 | 3.7 | 1.1 |
| Durene Dist., wt. % of Total $C_{10}$ Aromatics | 73 | 30 | 30 | 36 | 30 | 29 | 27 |

The higher pressures are necessary for production of distillate with acceptable quality.

TABLE 9

| 330° F. + Distillate Yield and Products | | | | | | |
|---|---|---|---|---|---|---|
| Pressure, psig | Charge | 400 | 700 | | 1500 | |
| Temperature °F. | | 650 | 650 | 550 | 600 | 650 |
| 330° F. + Dist., wt. % | — | 54.7 | 41.4 | 78.0 | 61.6 | 32.6 |
| Gravity, °API | 29.5 | 31.6 | 35.4 | 34.0 | 38.2 | 42.2 |
| Specific | 0.8789 | 0.8677 | 0.8476 | 0.8551 | 0.8338 | 0.8145 |
| Pour Point °F. | +85 | −20 | −70 | +20 | <−70 | <−70 |
| Aniline No. | — | <20 | <20 | 40.0 | 83.9 | 117.1 |
| Diesel Index | — | <10 | <10 | 14 | 32 | 49 |
| H/C Ratio | 1.40 | 1.49 | 1.55 | 1.66 | 1.75 | 1.84 |

The distillate made at 1500 psig, 650° F. meets the minimum diesel index of 45. It is primarily naphthenic, as indicated by the low H/C ratio (FIG. 4). Yield based on the original MTG gasoline is 3.6 weight percent. The 7.4 weight percent IBP-330° F. gasoline has an O.N. (R+O) of 77.5.

B. Co/Mo/Al Catalyst

Acidity and hydrogenation activity of this catalyst were too low for any significant conversion of durene with aromatic ring preservation or hydrogenation of aromatics except at severe conditions (Table 2). At 2000 psig, 750° F., durene was lowered from 44 to 28 weight percent and total aromatics from 96 to 71 weight percent (Table 4).

C. Pt/Al Catalyst

This catalyst also exhibited little conversion of durene with aromatic ring preservation, but was more active for hydrogenation than Co/Mo/Al. At 1500 psig, 750° F., durene was reduced to 5 weight percent, and total aromatics to 18 weight percent (Table 3). Results compare with the Ni/W/Ti/Si/Al catalyst as follows:

TABLE 10

Comparison of Pt/Al with Ni/W/Ti/Sa/Al
1500 psig

|  | Pt/Al | Ni/W/Ti/Si/Al |
|---|---|---|
| Temperature, °F. | 750 | 650 |
| Durene, wt. % | 5.0 | 1.1 |
| Total Aromatics, wt. % | 18.0 | 7.8 |
| $C_4$-, wt. % | 0.4 | 7.1 |
| $C_5$-330° F. Gasoline, wt. % | 55.3 | 64.3 |
| O.N., R + O | 76.0 | 77.5 |
| 330° F. + Distillate, wt. % | 48.8 | 32.6 |
| Gravity, °API | 39.4 | 42.2 |
| Pour Point, °F. | <−70 | <−70 |
| Aniline No., °F. | 118.2 | 117.1 |
| Diesel Index | 47 | 49 |
| H/C Ratio | 1.87 | 1.84 |

The Pt/Al catalyst makes less light paraffins, less low octane gasoline, and about 50% more 330° F.+ distillate of about the same quality as the Ni/W/Ti/Si/Al catalyst, and thus would be preferred for making distillate from methanol by this route.

D. Ni/W/Si/Al/REHY

The data in Table 5 shows that hydrogen is essential for durene reduction. When hydrogen is replaced with nitrogen, activity is lost and no durene reduction is obtained—even at temperatures as high as 900° F. Activity is regained when hydrogen is introduced again. This is graphically demonstrated in FIG. 5 which is based on Table 5.

Figure 5:
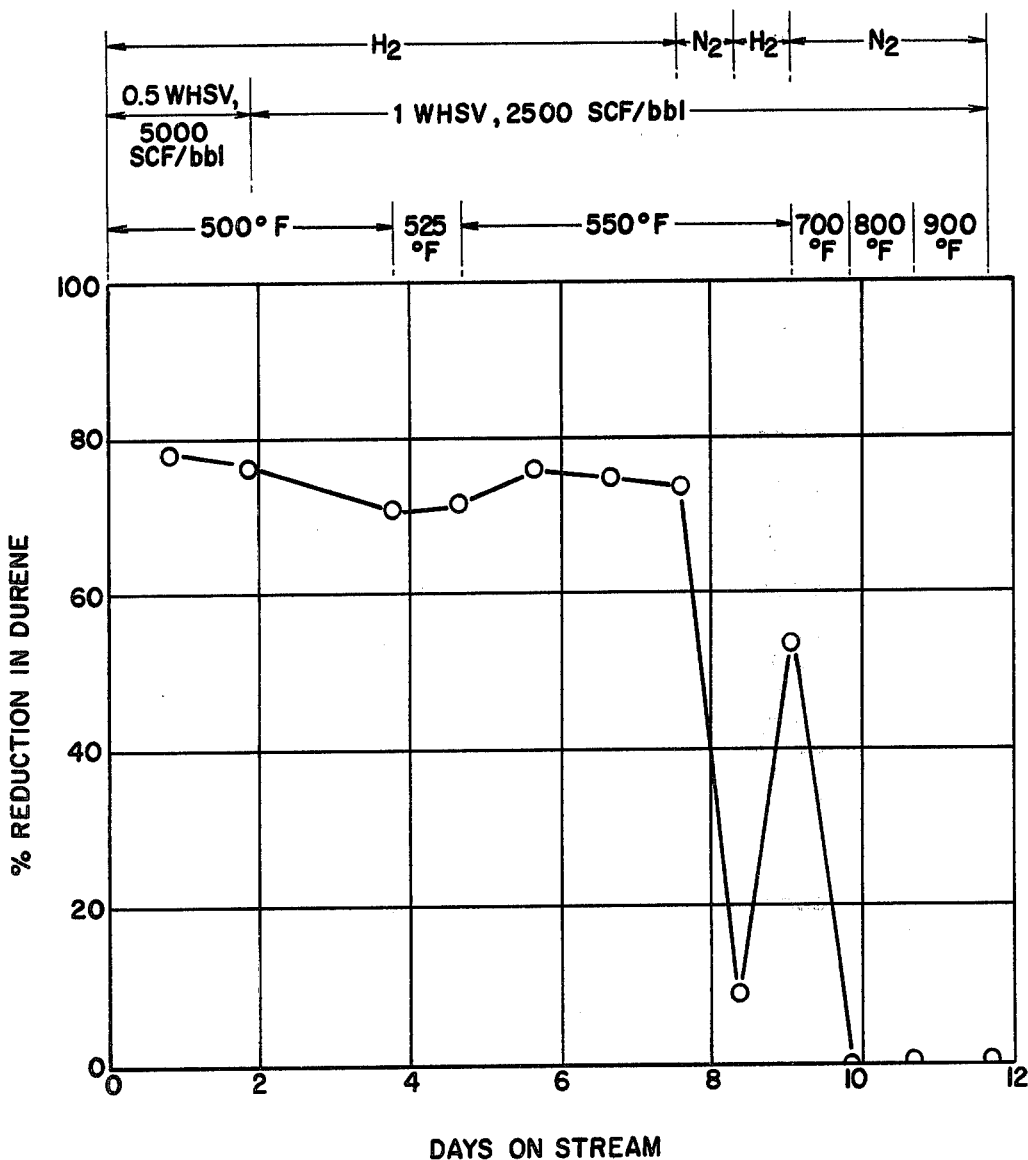
FIG. 5 is a plot of percent reduction in durene versus days on stream with and without hydrogen.

FIG. 5 is a plot of durene reduction versus days on stream with and without hydrogen. As can be seen, durene reduction was almost nil with nitrogen.

Catalyst D is superior to Catalyst C in durene reduction, octane number, and hydrogen consumption. This is shown in the following Table 11:

TABLE 11

Comparison of Catalyst C with Catalyst D
Charge 350° F.+ MTG Bottoms
400 psig, 500° F.

|  | Catalyst C | Catalyst D |  |
|---|---|---|---|
| WHSV | 0.5 | 0.5 | 1.0 |
| SCF $H_2$/BBL | 5000 | 5000 | 2500 |
| TOS, Days | 3.5 | 2 | 4 |
| Yields, Wt. % |  |  |  |
| $C_1 + C_2$ | <0.1 | 0.1 | <0.1 |
| $C_3$ | 0.3 | 1.6 | 0.7 |
| $C_4$ | 0.4 | 1.3 | 0.7 |
| $C_5$ | 99.9 | 97.5 | 98.7 |
|  | 100.6 | 100.4 | 100.1 |
| $H_2$ Cons., SCF/BBL | 360 | 210 | 40 |
| Durene Charge, Wt. % | 43.8 | 51.9 | 51.9 |

TABLE 11-continued

Comparison of Catalyst C with Catalyst D
Charge 350° F.+ MTG Bottoms
400 psig, 500° F.

|  | Catalyst C | Catalyst D |  |
|---|---|---|---|
| Product, Wt. % | 15.8 | 12.2 | 15.2 |
| % Reduction | 64 | 76 | 71 |
| $C_5$+ O.N., R + O | 99.9 | 103.1 | 102.0 |

What is claimed is:

1. A process for decreasing the durene content of a 200°–400° F.+ bottoms fraction obtained from the catalytic conversion of methanol to gasoline which comprises contacting said durene-containing 200–400° F.+ bottoms fraction with hydrogen at elevated temperatures and pressures over a supported hydrogenation metal catalyst for a period of time sufficient to decrease said durene and enhance the production of distillate.

2. The process of claim 1 wherein said hydrogenation metal is supported on a non-acidic support.

3. The process of claim 1 wherein said hydrogenation metal is supported on an acidic support.

4. The process of claim 2 wherein said support is alumina.

5. The process of claim 3 wherein said support is silica-alumina.

6. The process of claim 5 wherein said support is a mixture of rare earth faujasite and silica-alumina.

7. In a process for the catalytic conversion of methanol to gasoline by contacting methanol with a crystalline aluminosilicate zeolite of the ZSM-5 type at elevated temperatures and pressures so as to obtain a durene-containing gasoline fraction, the improvement which comprises:

(1) subjecting said durene-containing gasoline fraction to a distillation step so as to remove at least the light olefinic fraction and obtain a durene-containing bottoms fraction (2) hydrotreating said durene-containing bottoms fraction by contacting it with hydrogen over a hydrogenation metal supported catalyst at temperatures ranging from about 450°–800° F. and pressures ranging from about 50–3000 psig so as to decrease the durene content and enhance production of distillate.

8. The process of claim 7 wherein the hydrogenation metal is on an acidic support and the hydrotreatment is carried out at a temperature of 450°–600° F. and a hydrogen pressure of 200–400 psig.

9. The process of claim 8 wherein said acidic support is silica-alumina.

10. The process of claim 8 wherein said support is rare earth faujasite mixed with silica-alumina.

11. The process of claim 10 wherein said hydrotreating catalyst contains nickel and tungsten.

12. The process of claim 10 wherein the said hydrotreating catalyst contains platinum.

13. The process of claim 7 wherein the hydrogenation metal is on a non-acidic support and the hydrotreatment is carried out at a temperature of 500° to 900° F. and a pressure of 500 to 3000 psig.

14. The process of claim 13 wherein said support is alumina.

15. The process of claim 14 wherein said hydrotreating catalyst is platinum on alumina.

* * * * *

UNITED STATES PATENT AND TRADEMARK OFFICE
CERTIFICATE OF CORRECTION

PATENT NO. : 4,304,951

DATED : December 8, 1981

INVENTOR(S) : William E. GARWOOD et al

It is certified that error appears in the above—identified patent and that said Letters Patent is hereby corrected as shown below:

Column 3, line 54, change "1,2,4,5 (Durene)  6.8    2.6    43.8" to
---"1,2,4,5 (Durene)    6.8    2.6    43.8---

Column 4, line 20, insert ---(C)--- before "Ni/W/Ti/Si/Al"

Column 5, line 69, change "91.4" to ---94.1---

Column 8, line 16, change "±85" to ---+85---

Column 7-8, line 58, insert --650-- after "650" (second occurrence) and move each of the following figures; 550, 600, 651, 751, 752, over one column.

Column 7, line 51, change "Four Point, °F." to ---Pour Point, °F.---

Column 9-10, line 12, insert ---2.8--- after "3.6" and move each of the following figures: 0.5, 1.3, 2.8, 0.3, 0.3, over one column.

Column 9-10, line 69, change "60.3" to ---70.3---

Column 11-12, line 6, change "79" to ---78---

Column 13, line 14, change "Ni/W/Ti/Sa/Al" to ---Ni/W/Ti/Si/Al---

Signed and Sealed this

Twenty-fifth Day of May 1982

[SEAL]

Attest:

GERALD J. MOSSINGHOFF

Attesting Officer

Commissioner of Patents and Trademarks